United States Patent Office 2,701,791
Patented Feb. 8, 1955

2,701,791

WATER SOFTENING PROCESS

Frederick K. Lindsay, Western Springs, Ill., assignor to National Aluminate Corporation, Chicago, Ill., a corporation of Delaware No Drawing. Application December 12, 1950, Serial No. 200,490

7 Claims. (Cl. 210—16)

This invention relates to a method of pre-treating water to remove hardness or scale forming components, including calcium carbonate, calcium bicarbonate and silica, and particularly relates to the treatment of boiler make-up water.

It is well known that boiler water requires treatment in order to remove hardness which would otherwise form scale in the boiler and interfere with the efficient generation of steam. One of the methods which has been most commonly used to reduce hardness is the employment of a hot lime soda softener. It is not possible to remove all of the hardness by the use of such a softener and hence it has also been customary to further reduce the hardness by a secondary treatment with a phosphate. In the operation of this two-stage process the first stage produces a turbidity which apparently is due to calcium carbonate and magnesium hydroxide. In order to remove the turbidity it is customary to employ a filter between the first and second stage.

One of the objects of the present invention is to provide a new method of treating water to make it suitable for use as boiler make-up water.

Another object of the invention is to provide a method of treating water to remove scale forming components by a process which takes advantage of the first stage used in the hot lime-soda process and provides a second stage which is superior to the ordinary phosphate treatment.

Still another object of the invention is to provide a two-stage process for reducing hardness in water without intermediate filtering of the water between the two stages. Other objects will appear hereinafter.

In accordance with the invention it has been found: (1) that water insoluble sulfonated polymerizates of polyvinyl aryl compounds and more particularly the water insoluble sulfonated polymerizates of a mixture of divinyl benzene and styrene are stable in alkaline aqueous solutions at a pH of 9.5 or higher and at temperature of at least 220° F., preferably within the range of 220° F. to 335° F.; (2) that the polymerizates described under (1) can be employed in the second stage of a water treatment in which the first stage consists of a hot process lime-soda treatment or lime-sodium aluminate treatment; and (3) that the two-stage treatment of water using a hot process lime-soda treatment or a hot process lime-sodium aluminate treatment in the first stage and a water insoluble alkali stable cation exchanger in the second stage can be operated without an intermediate filtration.

The invention will be illustrated but not limited by the following example.

The process was operated over an eight-month period in a plant wherein the steam generating equipment consisted of two boilers operating at 425 p. s. i. g., each rated at 225,000 lbs. steam per hour. The make-up water had the following average composition:

|  | Parts per Million (P. P. M.) |
|---|---|
| Cations: | |
| Calcium (as CaCO₃) | 108 |
| Magnesium (as CaCO₃) | 59 |
| Sodium (as CaCO₃) | 13 |
| Total Cations (as CaCO₃) | 180 |
| Anions: | |
| Bicarbonate (as CaCO₃) | 129 |
| Carbonate (as CaCO₃) | 10 |
| Sulfate (as CaCO₃) | 15 |
| Chloride (as CaCO₃) | 26 |
| Total Anions (as CaCO₃) | 180 |
| Total Hardness (as CaCO₃) | 167 |
| Methyl Orange Alkalinity (as CaCO₃) | 139 |
| Silica (as SiO₂) | 3 |
| Dissolved Solids | 268 |
| Turbidity (as SiO₂) | 3 |
| pH | 8.6 |

In this same plant prior to the introduction of the invention a hot lime-soda-phosphate system was used for the pre-conditioning of water for boiler make-up. The rated capacity of the unit was 125,000 lbs. of water per hour. The operating temperature in the hot process softener was approximately 230° F. The average conditions of operation of the hot lime-soda-phosphate softener were shown by the average composition of the raw water, the treated water, the boiler water and the carbon dioxide content of the boiler steam as given in the following table:

| Parts per Million (P. P. M.) | Raw Water | Hot Lime Soda Softener Effluent | Phosphate Softener Effluent | Boiler Water | Boiler Steam |
|---|---|---|---|---|---|
| Total Hardness (as CaCO₃) | 167 | 35 | 3.0 | 0 |  |
| Calcium Hardness (as CaCO₃) | 108 | 27 | 2.0 | 0 |  |
| Magnesium Hardness (as CaCO₃) | 59 | 9 | 1.0 | 0 |  |
| Phenolphthalein Alkalinity (as CaCO₃) |  | 40 | 40 | 100 |  |
| Methyl Orange Alkalinity (as CaCO₃) | 139 | 55 | 55 | 150 |  |
| Hydroxide Alkalinity (as CaCO₃) |  | 35 | 35 | 50 |  |
| Phosphate (as PO₄) |  |  | 30 | 100 |  |
| Silica (as SiO₂) | 4 | 2 | 2 | 20 |  |
| Carbon Dioxide (as CO₂) |  |  |  |  | 4 |
| Dissolved Solids | 268 |  |  | 650 |  |
| Turbidity (as SiO₂) | 3 | 27 | 50 |  |  |
| Aluminia (as Al₂O₃) | Tr. | Tr. | Tr. | Tr. |  |
| pH | 8.6 | 10.0 | 9.8 | 11.0 |  |

Total hardness reduction was from an average of 167 p. p. m. as CaCO₃ in the raw water to 3 p. p. m. in the phosphate softener effluent. Of this 3 p. p. m., 1 p. p. m. was magnesium. Silica reduction was from 5 p. p. m. to 2 p. p. m. through the softener. The turbidity of the phosphate softener effluent averaged 50 p. p. m. and it was evident that the frequent fouling of the filters and outages of the boilers for mechanical and chemical cleaning were due to this cause. The carbon dioxide content of the boiler steam under these conditions averaged 4 p. p. m. as CO₂.

In the operation of this original installation the effluent from the hot lime-soda softening stage was filtered before being treated in the phosphate stage.

For the purpose of this invention the filter medium was removed from the three 6-foot 6-inch filter shells which were part of the original softening system and 21-inch beds of a sulfonated divinylbenzene-styrene resin ion exchange material (Nalcite HCR) supported by 10 inches of graded anthracite were installed in the filter shells.

The water was then treated in this system using hot lime-soda in the first stage and a hot styrene resin exchange softener in the second stage. The temperature of operation in both stages was about 230° F. Over a period of 41 days the total hardness reduction was from an average of 167 p. p. m. as CaCO₃ in the raw water to 1.8 p. p. m. in the secondary softener effluent. Of this 1.8 p. p. m., 0.6 p. p. m. was magnesium hardness. The turbidity of the primary softener effluent averaged 40 p. p. m. as $SiO_2$ under these conditions. Silica reduction through the softener was negligible and the average carbon dioxide content of the boiler steam was determined to be 5 p. p. m. as $CO_2$.

Thereafter, over a 50-day period 15 p. p. m. of sodium aluminate was fed to the primary softener with the lime. Total hardness reduction was from an average of 167 p. p. m. as $CaCO_3$ in the raw water to 0.6 p. p. m. in the secondary softener effluent. Of this 0.6 p. p. m., 0.1 p. p. m. was magnesium hardness. Silica reduction was from 3 p. p. m. in the primary softener influent to 0.8 p. p. m. in the secondary softener effluent. The turbidity of the primary softener effluent averaged 4 p. p. m. as $SiO_2$. The carbon dioxide content of the boiler steam under these conditions averaged 5 p. p. m. as $CO_2$.

The foregoing process was then modified somewhat by circulating 5% of the sludge from the bottom of the cone of the primary softener to the downtake tube within the softener. No changes were made in the chemical feed to the primary softener, that is, the chemicals used were lime, soda ash and sodium aluminate.

Over a subsequent 30-day period total hardness reduction was from an average of 167 p. p. m. as $CaCO_3$ in the primary softener influent to 0.6 p. p. m. in the secondary softener effluent. Of this 0.6 p. p. m., 0.1 p. p. m. was magnesium hardness. Silica reduction was from 3 p. p. m. in the primary softener influent to 0.7 p. p. m. in the secondary softener effluent. The turbidity of the effluent of the primary softener averaged 2 p. p. m. as $SiO_2$. The carbon dioxide content of the boiler steam averaged 3 p. p. m. during this period.

Normal operation of a lime soda softener entails the maintenance of an excess of carbonate alkalinity in the effluent to assure maximum reduction of the non-carbonate hardness. Since experience with the secondary hot styrene resin softener indicated that essentially calcium-free water could be produced with any reasonable concentration of calcium salts present in the secondary softener influent, it was decided to eliminate the soda ash feed to the primary softener and use lime and sodium aluminate alone as the softening chemicals. It was thought that the ratio of magnesium and aluminum oxides in the sludge would be increased appreciably as a result of decreased precipitation of calcium carbonate, and thus permit greater removal of silica in the primary unit. In addition, it was certain that elimination of soda ash feed to the primary softener would decrease the carbon dioxide content of the boiler steam.

Over a period of 51 days' operation of the lime-sodium aluminate-styrene resin secondary softener the total hardness reduction was from an average of 167 p. p. m. as $CaCO_3$ in the primary softener influent to 0.5 p. p. m. in the secondary softener effluent. Of this 0.5 p. p. m., 0.1 p. p. m. was magnesium hardness. Silica reduction was from 3 p. p. m. in the primary softener influent to 0.5 p. p. m. in the secondary softener effluent. The turbidity of the effluent of the primary softener averaged 0.7 p. p. m. The carbon dioxide content of the boiler steam averaged 1.0 p. p. m. in this period.

Since the raw water supplied to this plant is characterized by a relatively low non-carbonate hardness content which is not typical of all waters treated with the hot process system, calcium chloride was fed to the influent of the primary softener for the duration of one operating cycle in order to evaluate the performance of the hot lime-aluminate-hot styrene softening system with higher non-carbonate waters. The hardness reduction from the primary softener was from 211 p. p. m. as $CaCO_3$ in the influent to 80 p. p. m. in the effluent. Of this 80 p. p. m., 8 p. p. m. was magnesium hardness. The total alkalinity of this effluent averaged 20 p. p. m. as $CaCO_3$ which is attributed to the relatively high excess calcium. The hardness was further reduced through the hot styrene resin exchanger to an average of 0.5 p. p. m. of which 0.1 p. p. m. was magnesium hardness.

Silica reduction was from 3 p. p. m. in the primary softener influent to 0.5 p. p. m. in the secondary softener effluent. The turbidity of the effluent of the primary softener averaged 1 p. p. m. as $SiO_2$. The carbon dioxide content of the boiler steam did not exceed 1 p. p. m. in this period.

To illustrate the regenerating and operating capacity of the hot styrene resin ion exchanger over a 50 hour period (one operating cycle) under the conditions of sustained high influent hardness just described, approximately 600 lbs. of sodium chloride were required to regenerate 60 cubic feet of the divinylbenzene-styrene sulfonated resin. In other words, 10 lbs. of sodium chloride were used per cubic foot of ion exchange resin. The weight percentage of sodium chloride in the regenerant solution going to the cation exchanger was approximately 20%. The maximum concentration of regenerant effluent was approximately 12%. The brine contact period was approximately 40 minutes. The number of gallons of water treated was approximately 302,000. The hardness removed was approximately 1,485,000 grains as $CaCO_3$. The operating rate was approximately 3 gallons per minute per square foot of ion exchange resin.

After eight months of operation the entire exchanger bed of one of the units was transferred for an examination of the sub-fill and the bottom of the bed. In addition, a representative sample was taken from the entire exchanger bed for critical laboratory examination.

The sample was evaluated in the laboratory for capacity in an "as received" condition. Regeneration was accomplished with a 10% solution of sodium chloride at a dosage equivalent to 15 lbs. per cubic foot. The capacity achieved was 33,000 grains per cubic foot as $CaCO_3$. This capacity rating can only be reached with a resin which is free of chemical or mechanical fouling. It was thought that the ion exchange resin would become encrusted with calcium carbonate and other insoluble materials under conditions of operation when no filtration was employed between the primary and secondary softening units but such was not the case as evidenced by the fact that the resin when regenerated still had a capacity of 33,000 grains per cubic foot.

Apparently, when the water is reduced in hardness as it passes through the ion exchange unit a continuous resolution of any precipitated calcium carbonate occurs which may exist in the spaces between the beads of the ion exchange resin. This is immediately exchanged to sodium carbonate as is shown by a slight increase in the alkalinity in the water passing through the hot styrene resin exchanger. Surprisingly, therefore, it is possible to eliminate the intermediate filtration. Likewise, it is unnecessary to subject the exchanger beds to periodic acid washing in order to remove contamination caused by the precipitated calcium carbonate and other ingredients from the primary stage.

In the operation described in the foregoing example all back-washing brining and rinsing of the secondary softener was accomplished at a temperature at or near 230° F. Only 2% of the beads of the styrene resin were found to be broken after eight months' continuous service. It was possible to operate the plant unattended by an operator for a period from between 12 to 16 hours except for periodic inspection of the primary softener feed equipment.

In the practice of the invention the pH of the water treated is normally at least 9.5 and preferably within the range of 9.5 to 11.5.

The temperatures used in the primary stage of the treatment are preferably at least 220° F. and are usually around 230° F. In the secondary stage of the treatment the same temperatures may be used as those employed in the primary stage although substantially higher temperatures may be used.

In the tests carried out on unfiltered water from hot process softeners turbidities as high as 100 p. p. m. have been handled by the secondary resin softening unit. However, since the ion exchange bed serves in part as a filter the higher concentrations of turbidity make it necessary to back-wash much more frequently and thoroughly than when operating on filtered water. The back-washing may vary from once every eight hours to once every eight days, depending on the turbidity load being handled by the softener. The back-wash water used for the mechanical cleaning of the ion exchange beds can be returned to the primary softener. The water used in making up the brine and for subsequent rinsing of the resin bed is discharged to waste. It will be understood that it is not absolutely necessary to use a hot brine in the regeneration. Optimum results are achieved when the brine concentration in contact with the resin bed can be kept in excess of 8% sodium chloride by weight for a period of 30 minutes or more.

Plant and pilot plant experiences in the practice of the invention have repeatedly shown that the process is capable of treating waters to a finished hardness of 0.5 p. p. m. or less, of which approximately 0.1 p. p. m. is magnesium hardness. Secondary phosphate softeners finishing the same influent were able to reduce the hardness to a residual hardness of approximately only 0.9 p. p. m. Thus, high temperature ion exchangers applied for secondary softening following hot lime-soda softening has produced a better water at a lower cost of labor control and chemicals than that resulting from secondary phosphate softening. At the same time it has been possible to eliminate some of the equipment, such as filters, which have heretofore been employed in lime-soda softening processes. The present invention is especially advantageous where it is necessary to remove substantially all hardness in the make-up water externally of the boiler as, for example, in those operations where great boiler loads and high temperatures are required.

The following definite benefits are obtained when operating the hot process system as a lime-sodium aluminate softener followed by a hot styrene resin ion exchange unit:

1. Lime and sodium aluminate can be fed in combination to the softener by the utilization of a single chemical feeder for practically any water supply. This results in greatly simplified chemical dosage control.

2. Improved silica removal and lower primary softener turbidities are accomplished. This is attributed to higher concentrations of magnesium and aluminum oxides in the sludge.

3. Effective correction of the lime-aluminate softener effluent hardness variation is accomplished in the secondary ion exchange softener. It is almost impossible to correct such variations in the operation of a secondary phosphate softener because of the lag due to retention time. The secondary ion exchange softener provides hardness reduction to extremely low values regardless of the incidence, type or quantity of hardness in the primary softener effluent.

4. Control of the magnesium content of the boiler feed water to extremely low values is possible with consequent prevention of the formation of magnesium phosphate sludges and other objectional magnesium deposits in high pressure boilers. Magnesium hardness is the most difficult to remove in precipitation type softeners and requires that very high hydrate excesses be maintained in such softeners. Resultant high boiler water alkalinities often cannot be tolerated in high pressure boiler water and in many cases pH correction of the boiler feed must be accomplished by troublesome acid feeding systems.

5. The carbon dioxide content of the boiler steam is maintained at a minimum value. This results in decreased corrosion of the condensate return and pre-boiler systems due to carbon dioxide attack. Where magnetic iron oxide deposits in high pressure boilers are caused by the introduction of iron to the boiler with the boiler feed, any means of reducing the iron content of the feedwater will reduce the incidence and severity of such deposits within the boiler.

6. Feed of sodium phosphate and other feed and boiler water treatment chemicals may be accomplished under low pressure conditions to the effluent of the secondary ion exchange softener without the possibility of feed system deposits, because of the consistent extremely low hardness of this effluent. This avoids the necessity of installing and maintaining expensive, high pressure pumps for the feeding of these chemicals directly to the boiler drum or to some high pressure point in the feed system.

The styrene ion exchange resins herein referred to are of the type described in U. S. Patent 2,366,007. It will be understood that the invention resides in the manner in which the resins are employed.

The term "lime softening" as employed herein is intended to include those processes where lime is employed in conjunction with soda ash or alkaline materials for the treatment of water to separate the hardness components by precipitation. The term "lime-sodium aluminate softening" as employed herein refers to a softening process in which sodium aluminate is used in conjunction with the lime with or without the addition of sodium carbonate.

The invention is hereby claimed as follows:

1. A method of softening hard waters which comprises subjecting said hard waters in a primary stage to a hot lime softening process and then passing the waters from said primary stage directly into contact with a water insoluble sulfonated polymerizate of a polyvinylaryl compound having cation exchange properties, and carrying out said process in both of said stages at temperatures within the range of 220° F. to 335° F. and a pH within the range of 9.5 to 11.5.

2. A method of softening hard waters which comprises subjecting said hard waters in a primary stage to a hot lime softening process and then passing the waters from said primary stage directly into contact with a water insoluble sulfonated polymerizate of divinylbenzene and styrene and carrying out said process in both of said stages at temperatures within the range of 220° F. to 335° F. and a pH within the range of 9.5 to 11.5.

3. A process as claimed in claim 2 in which the temperature is approximately 230° F.

4. A method of softening hard waters which comprises subjecting said hard waters in a primary stage to a hot lime softening process, passing the effluent from said lime softening process directly into contact with a bed of cation exchange material, consisting essentially of a water insoluble sulfonated polymerizate of a polyvinylaryl compound, back-washing said bed of cation exchange materials at intervals sufficient to remove entrained solids, and treating said bed of cation exchange materials at intervals with a regenerating solution, said lime softening process and said treatment of the water resulting therefrom being effected at temperatures within the range of 220° F. to 335° F. and a pH within the range of 9.5 to 11.5.

5. A process as claimed in claim 4 in which the regenerating solution is a hot sodium chloride solution.

6. A method of softening hard waters which comprises subjecting said hard waters in a primary stage to a hot lime-sodium aluminate softening process and then passing the waters from said primary stage directly into contact with a water insoluble sulfonated polymerizate of a polyvinylaryl compound having cation exchange properties, and carrying out said process in both of said stages at temperatures within the range of 220° F. to 335° F. and a pH within the range of 9.5 to 11.5.

7. A method of softening hard waters which comprises subjecting said hard waters in a primary stage to a hot lime-sodium aluminate softening process, passing the effluent from said lime-sodium aluminate softening process directly into contact with a bed of cation exchange material consisting essentially of a water insoluble polymerizate of a divinylbenzene and styrene, back-washing said bed of cation exchange materials at intervals sufficient to remove entrained solids, and treating said bed of cation exchange materials at intervals with a regenerating solution, said lime-sodium aluminate softening process and said treatment of the water resulting therefrom being effected at temperatures within the range of 220° F. to 335° F. and a pH within the range of 9.5 to 11.5.

References Cited in the file of this patent

UNITED STATES PATENTS

| Number | Name | Date |
|---|---|---|
| 1,305,123 | Kriegsheim | May 27, 1919 |
| 2,206,691 | Furness et al. | July 2, 1940 |
| 2,291,226 | Higgins | July 28, 1942 |
| 2,366,007 | D'Alelio | Dec. 26, 1944 |
| 2,471,213 | Higgins | May 24, 1949 |

FOREIGN PATENTS

| 549,111 | Great Britain | Nov. 6, 1942 |

OTHER REFERENCES

Power, vol. 91, No. 8, December 1947, pages 67 and 68.

Am. Chem. Soc. J., vol. 69, November 1947, pages 2830–36.

Permutit, pamphlet by the Permutit Co., 440 Fourth Ave., New York city, 1932, pages 10–15.